O. W. SMITH.
VALVE FOR STEAM AND WATER SYSTEMS.
APPLICATION FILED JUNE 1, 1920.
1,379,840.
Patented May 31, 1921.
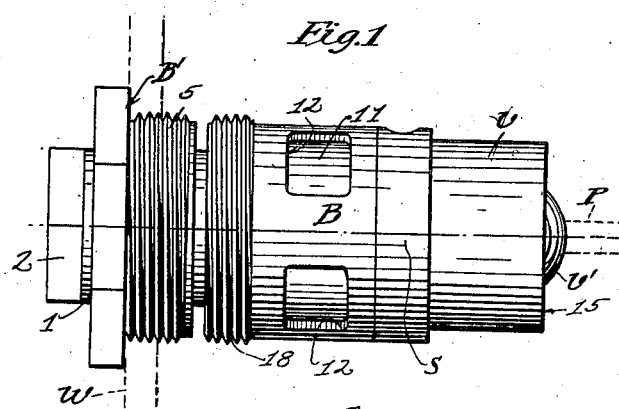
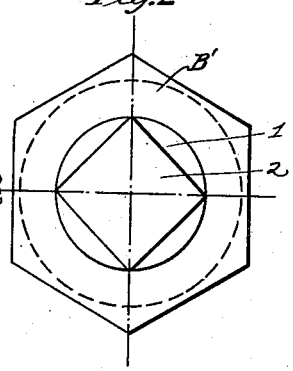
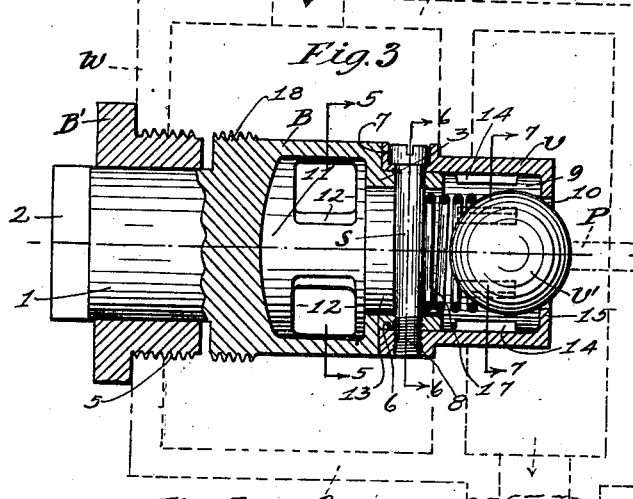
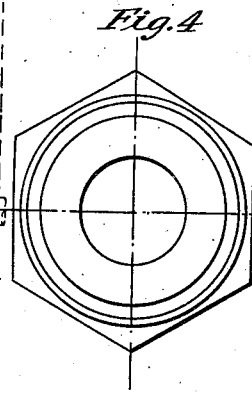
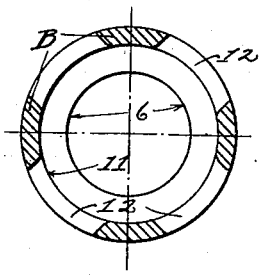
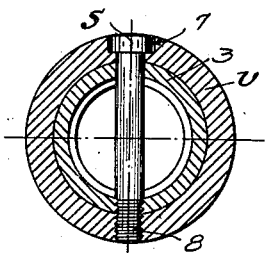
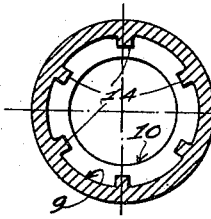
INVENTOR.
Oliver W. Smith,
Attorney.

UNITED STATES PATENT OFFICE.

OLIVER W. SMITH, OF LOS ANGELES, CALIFORNIA.

VALVE FOR STEAM AND WATER SYSTEMS.

1,379,840.     Specification of Letters Patent.     Patented May 31, 1921.

Application filed June 1, 1920. Serial No. 386,383.

*To all whom it may concern:*

Be it known that I, OLIVER W. SMITH, a citizen of the United States, and a resident of Los Angeles, in the county of Los Angeles, State of California, have invented new and useful Improvements in Valves for Steam and Water Systems, of which the following is a specification.

My invention relates to valves, and has for an object the provisions of a valve particularly adapted for use for controlling the flow of water to a steam boiler and arranged to be opened by pressure from the boiler when the water therein has reached a low level, so as to replenish the supply in the boiler, and includes as a subsidiary object the provision of a suitable device for holding the valve normally closed and for automatically closing the valve when the operating pressure has been released therefrom.

Other objects may appear as the description progresses.

I have shown one practical embodiment of my invention in the accompanying drawings forming a part of this application, in which:

Figure 1 is a side view of my valve.

Fig. 2 is an end view of the valve.

Fig. 3 is a longitudinal section of the same.

Fig. 4 is a reverse end view thereof.

Fig. 5 is a section on line 5—5 of Fig. 3.

Fig. 6 is a section on line 6—6 of Fig. 3.

Fig. 7 is a section on line 7—7 of Fig. 3.

My improvements consist of a body portion B having a stem 1 integral therewith on the end of which is a squared or hexagonal portion 2 to receive a wrench, and a reduced portion 3 on the opposite end thereof; a bushing B' having a wrench receiving head 4 and an externally threaded portion 5 adapted to be screwed into the wall W of a suitable casing (not shown); a cup-like valve body V bored at 6 to receive the end 3 of member B and adapted to be held thereon by means of a screw S having its head seating in a counter bore 7 on the periphery of member V and its threaded end 8 held in a tapped hole in said member opposite the said counterbore; and a ball valve V' movably held within the chamber 9 of member V and adapted to seat in and to open and close the port 10 of said member.

Body member B has a chamber 11 therein with a plurality of peripheral apertures 12, 12, etc., formed therein, through which water, steam or other elements may be admitted to the said chamber from the inlet chamber of casing C as shown in Fig. 3, and a central passage 13 in the end of member B affords continuous communication between chamber 11 and valve chamber 9.

The inner periphery of chamber 9 has a plurality of longitudinal ribs 14, 14, etc. formed thereon between which the ball valve V' is slidably held and is adapted to be moved backwardly and forwardly thereover and has a range of movement extending from the end 15 of member V to the end 3 of member B. A coil spring 17 is held in tension between the ball V' and the screw S and serves to hold the port 10 of member V normally closed. Member B also has a threaded portion 18 on its end of the same size as that portion 5 of member B' so that it may also be screwed into the casing wall W.

It will be obvious that pressure in the inlet chamber of casing C, and from the exterior of member B, like that of water for instance, when the valve V' is closed, as shown, will only serve to close the port 10 the tighter and water or the like will be prevented from discharge through the port 10 into the outlet chamber of said casing. But when a pressure operated member P, which may be operated by an expansion element such as is used in devices for controlling the flow of water to a boiler, is forced into contact with ball V' with sufficient pressure to compress the spring 17, ball V' will recede from the port 10 and permit the flow of the water or other elements from the inlet chamber of the casing through said port, to and from the outlet chamber. When pressure on member P is relieved the ball valve V' will obviously be automatically restored until the necessity of more water again occurs.

While I have described my invention with reference to a boiler feed system, it will be understood that the same may be employed in other systems and for other purposes than those stated with equally good effect, and its structure may be modified to meet varying conditions without departing from the spirit of my invention or enlarging the scope thereof beyond the appended claims.

What I claim, is:

1. A valve having a body provided with a chamber and a plurality of peripheral apertures for receiving a fluid, a valve portion detachably held thereon at one end and having a chamber communicating with that in said body, and a valve in said valve portion for regulating the discharge of said fluid.

2. A valve comprising main and secondary body members detachably held together for use and in continuous communication with each other, an attaching member held in one of said body members and extending through the other body member, and a valve held in said secondary member and adapted to be held in tension between said attaching member and the end of said secondary member.

3. A valve body having a central stem thereon and adapted to be screwed into a casing wall, a bushing on said stem and also adapted to be screwed into said casing wall, for positioning the valve for use, and a detachable valve casing carried on the opposite end of said body.

4. A valve having a central body member provided with external threads and an internal chamber having a plurality of peripheral apertures for affording communication with said chamber and a stem integral therewith, a bushing detachably held on said stem, and a valve body telescopically held on said central body member and having a valve therein, for the purpose set forth.

5. A valve comprising a valve body having reduced ends, a bushing carried on one end thereof and adapted to support the valve for use, a valve casing held on the other end thereof, a ball valve in said casing, and a pin extending through the telescoping portions of said body and said casing, a spring held between said ball and said pin for holding said valve normally closed.

OLIVER W. SMITH.

Witnesses:
　LUTHER L. MACK,
　E. M. DESSIEUX.